United States Patent Office

3,356,638
Patented Dec. 5, 1967

3,356,638
OXYCHLOROPOLYETHYLENE COATING
Richard C. Barrett, New Milford, N.J., assignor to Allied Chemical Corporation, New York, N.Y., a corporation of New York
No Drawing. Filed Jan. 20, 1964, Ser. No. 338,573
7 Claims. (Cl. 260—33.8)

ABSTRACT OF THE DISCLOSURE

The present invention more specifically relates to coating compositions incorporating an oxychloropolyethylene containing chemically combined chlorine in an amount of 30–80% by weight and chemically combined oxygen in an amount of 0.3–3% by total weight of oxygen and carbon in the oxychloropolyethylene which has molecular weight corresponding to an intrinsic viscosity between about 0.08 to 2.0 in o-dichlorobenzene at 100° C., said oxychloropolyethylene being desirably prepared by simultaneous oxidation and chlorination of a macromolecular polyethylene in suspension in a medium such as water, said oxychloropolyethylene forming especially useful coatings of unusual adhesion and other desired properties when combined with plasticizers or other chlorine-containing macromolecular resins such as vinyl chloride polymers and the like.

This invention relates to coating material, and more particularly to new and improved oxychloropolyethylene coating resin. It also relates to coating compositions containing said resin and to articles having their surfaces coated therewith.

It is well known to prepare compositions in which chlorine-containing macromolecular resins such as chlorinated synthetic and natural rubbers, vinyl polymers, and the like are dispersed or dissolved in a liquid medium for coating. These composition have one unfortunate limitation, namely, an insufficiency to form a coating having a satisfactory retention or adhesion when applied to smooth metal surfaces such as steel surfaces.

An object of the present invention is to provide an additive to chlorine-containing macromolecular resin compositions to impart strong adhesion properties when used as a coating. Another object of the invention is to provide improved coating compositions having oxychloropolyethylene incorporated therein. Another object is to provide new oxychloropolyethylene. A further object is to provide articles having a surface coated with oxychloropolyethylene. Other objects and advantages will be apparent from the following description of the invention.

In accordance with the invention I have discovered oxychloropolyethylenes which when incorporated as additive even in small amounts in the chlorine-containing macromolecular resins will impart ability to form high adhesion coatings of excellent quality upon metal surfaces. The effect of these new oxychloropolyethylenes is indeed striking when it is considered that even a very small amount of about 1% will change the adhesion coating properties of such chlorine-containing resins from a negligible level to an outstandingly high level. The oxychloropolyethylene of the invention is a thermally stable non-gelling oxychloropolyethylene containing chemically combined chlorine in an amount of 30–80% by weight of the oxychloropolyethylene and chemically combined oxygen in an amount of 0.3–3%, preferably 1–2%, by weight of the total weight of oxygen and carbon in the oxychloropolyethylene, said oxychloropolyethylene having an intrinsic viscosity between about 0.08 to 2.0 in o-dichlorobenzene at 100° C. and being derived from a linear polymer of ethylene having a high density between about 0.935 to 0.985. By way of illustration of the outstanding coating properties of such oxychloropolyethylenes, a solvent solution of a vinyl chloride-vinyl acetate copolymer has poor adhesion to steel but after addition of only about 1% of the oxychloropolyethylene the resin solution was found to form an exceptionally good protective coating on the steel surface. Similarly, conventional chlorinated polyethylenes which are unsuitable as a coating for steel and other metals were found to form a very satisfactory coating when combined with only a minor amount of the oxychloropolyethylene.

An important factor in the present invention is that the oxychloropolyethylenes contain only a small specific amount of oxygen between about 0.3% to about 3.0% based on the total weight of oxygen and carbon in the oxychloropolyethylene. Of particular interest is the fact that similar polymers not containing such oxygen are unsuitable for use in providing a satisfactory coating composition. More specifically, the oxychloropolyethylene must contain at least about 0.3% by weight oxygen in order to produce a coating having satisfactory adhesion. The polymers containing less than about 0.3% by weight oxygen lack the desired adhesion, particularly to smooth metal surfaces. On the other hand, the oxychloropolyethylenes containing substantially greater than about 3.0% by weight oxygen tend to form coatings which lack sufficient uniformity, stability and weather and heat resistance for practical application. Best results are obtained with oxychloropolyethylenes containing between about 1.0 to 2.0% by weight oxygen. It is also important that the oxychloropolyethylenes be derived from a linear polymer of ethylene characterized by a high density of at least about 0.935, usually between about 0.935 to 0.985. The oxychloropolyethylenes also have a molecular weight corresponding to an intrinsic viscosity of at least about 0.08 in o-dichlorobenzene at 100° C. The intrinsic viscosity values represent a more convenient and accurate measure of weight average molecular weight of the oxychloropolyethylenes, and such intrinsic vsicosities are generally relied on herein where it is desired to indicate molecular weight of the oxychloropolyethylenes. An intrinsic viscosity of 0.08 is believed to correspond to a weight average molecular weight value of approximately 15,000. The oxychloropolyethylenes having an intrinsic viscosity substantially less than about 0.08 tend to result in coatings having markedly reduced integrity and continuity. Oxychloropolyethylenes useful in forming coatings according to the invention may have intrinsic viscosities ranging up to about 2.0 in o-dichlorobenzene at 100° C. Usually, the preferred intrinsic viscosity of the oxychloropolyethylene will vary according to chlorine content, use and method of application of the oxychloropolyethylene containing coating composition. Generally, for most metal coating applications it is preferred to employ the lower molecular weight oxychloropolyethylenes.

The chlorine-containing resins which are benfitted by the addition of the oxychloropolyethylenes include both the synthetic chlorine-containing resins and the chlorinated natural resin materials such as chlorinated rubber. Generally, any chlorine-containing macromolecular resin having carbon to carbon alkylene linkage in its basic structure and chlorine content between about 30 to 80% by weight may be improved by combination with the oxychloropolyethylenes. Specific examples of the chlorine-containing resins which form exceptionally good coating compositions when combined with the oxychloropolyethylenes include the vinyl polymers such as polyvinyl chloride and the vinyl chloride copolymers such as the copolymers with vinylidene chloride, vinyl acetate, vinyl maleate and vinyl fumarate, particularly those vinyl polymers and copolymers containing between about 45–65% chlorine by weight; polyvinylidene chloride, the chlorinated lower alkene polymers such as conventional chlorinated polyethylene, chlorinated polypropylene, and chlorinated copolymer of ethylene and propylene, particularly those having a chlorine content between about 30 to 80% by weight; after chlorinated polyvinyl chloride and vinyl chloride copolymers; the chlorinated synthetic rubbers such as those produced by chlorination of a copolymer obtained from butadiene and acrylonitrile and/or styrene; and the chlorinated natural rubbers, preferably those chlorinated rubbers soluble in xylene and having a chlorine content between about 60–70%. Compositions containing about 1 to 50 parts of the oxychloropolyethylene per 100 parts of said other chlorine-containing resin provide coatings having exceptionally good adhesion and other desired coating properties not possessed by compositions containing only said other chlorine-containing resins. Desirably, the oxychloropolyethylenes are combined with a second chlorine-containing resin with which it is compatible, a factor which depends to a large extent on the difference in chlorine content between the two resins and the proportions in which they are combined. Usually, when only a minor amount of the oxychloropolyethylene is employed the difference in chlorine content may be greatest, as much as 40% or even more. More equal proportions require a less difference in chlorine content such that it is usually preferred that the combined chlorine-containing resins differ in chlorine content by not more than about 15% chlorine, more preferably between about 0–10% by weight chlorine. The oxychloropolyethylenes preferably combined with the macromolecular chlorine-containing resins, particularly with the vinyl polymers and copolymer of 45–65% chlorine, have a chlorine content between about 40–70% by weight and molecular weight corresponding to an intrinsic viscosity between about 0.1 to 0.8 in o-dichlorobenzene at 100° C. By way of illustration, a specific preferred composition of particular interest contains a copolymer of between about 80 to 95 parts vinyl chloride and 5 to 20 parts vinyl acetate and between about 1 to 50 parts, preferably 3 to 20 parts, per 100 parts of said vinyl copolymer of the oxychloropolyethylene of 40–70% by weight chlorine. Another specific example is a composition containing a copolymer of between about 50 to 95 parts vinyl chloride and 5 to 50 parts vinylidene chlorine and between about 1 to 50 parts, preferably 3 to 20 parts, per 100 parts of said vinyl copolymer of the oxychloropolyethylene of 40–70% by weight chlorine. Each of such illustrative compositions exemplify the invention in that the vinyl copolymers alone have good coating properties but lack adhesion to smooth metal surfaces. After addition of the oxychloropolyethylene of the invention the copolymer compositions form high quality coatings characterized not only by the excellent coating properties but also by high and lasting adhesion to the smooth metal surfaces.

The oxychloropolyethylenes employed in the invention are thermally stable, non-gelling materials which may be produced by subjecting substantially linear high density polyethylene to controlled oxidation and chlorination in a suitable medium. Preferably, the oxychloropolyethylenes are produced by chlorination of the high density polyethylene in aqueous slurry in the presence of molecular oxygen which is supplied along with the chlorine during a part or all of the chlorination in a controlled amount sufficient to add the desired amount of oxygen to the polymer. Usually, the oxygen is present during only a portion of the chlorination and added after the initial 5% chlorine has been added to the polymer. Once the oxygen is added it is desirable to conduct the chlorination substantially continuously and to completion in the presence of oxygen with exception of any period during which the temperature is above the crystalline melting point of the polyethylene starting material. Oxidation up to time of completion of the chlorination is believed to be a factor in the manner in which oxygen is introduced into the oxychloropolyethylene and influences the properties of the product. Such terminal oxidation produces the more thermally stable products, particularly from the lower and intermediate molecular weight polyethylene starting materials. The total amount of oxygen employed in preparing the oxychloropolyethylenes is between about 0.5% to 5.0%, preferably between 1.0–3.0%, based on the weight of the polyethylene starting material, depending largely on the desired oxygen and chlorine content of the oxychloropolyethylene and the molecular weight of the polyethylene starting material and oxychloropolyethylene product. The oxychloropolyethylenes containing an amount of chemically combined oxygen between about 1–2% by weight of the total oxygen and carbon in the oxychloropolyethylene are usually preferred. Temperatures employed during chlorination and oxidation are generally within the range of about 25–160° C., preferably between about 80–150° C.

The oxychloropolyethylenes suitable for use in the present invention may be prepared by oxidation and chlorination of a linear, high density polymer of ethylene. The terms "linear" or "substantially linear," as used herein and the appended claims, shall mean a polyethylene characterized by high density and at most only nominal short chain branching in the form of methyl groups, usually less than about 10 methyl groups per 1,000 carbon atoms. Particularly good results are obtained when employing the oxychloropolyethylenes which are derived from or produced by chlorination and oxidation of high molecular weight polyethylene prepared in accordance with the process described in British Patent 858,674 of Jan. 11, 1961 to Allied Chemical Corporation. By such a process a crystalline, high density polyethylene is prepared by gas phase polymerization of an anhydrous, oxygen-free ethylene over a porous frangible support catalyst prepared from an inorganic compound of chromium and oxygen and an active metal alkyl. The catalyst support is prepared from silica or silica-alumina. The ethylene polymers produced in accordance with the above-referred to British patent have a crystallinity of at least about 75%, usually between 75% and 85%, as measured by differential thermal analysis, a density between 0.935 and 0.985 grams/ml., and a weight average molecular weight of at least 700,000, usually between about 1.0 million to 5.0 million, as calculated according to the method of P. S. Francis et al. from the viscosity of about a 0.05 to 0.1 gram per 100 cc. solution in Decalin using the equation:

$$[n] = 6.77 \times 10^{-4} M^{0.67}$$

where $[n]$ = intrinsic viscosity
$M$ = weight average molecular weight (J. Polymer Science, vol. 31, pp. 543–466—September 1958.) The high molecular weight polyethylenes produced in accordance with Example 6 of the above-referred to British patent are linear materials which, however, may also be characterized by containing long chain linear polyethylene branches. These high molecular weight polyethylenes have a Melt Index less than 0.10 according to ASTM D1238–52T at 190° C. with a 2160 gram weight; tensile strength values of the order of about 5,000 p.s.i. according to ASTM D412–51T; ultimate elongation of at least 350 p.s.i., generally of the order of 370–470 p.s.i., according to ASTM D412–51T, and high impact strength of at least 15 ft.-lbs./in. of notch, usually between 15–25 ft.-lbs./in. notch, according to ASTM D256–54T (Izod).

The oxychloropolyethylenes of higher chlorine content above about 70% by weight are preferably prepared from the ethylene polymers of ultra high molecular weight of at least 700,000 by chlorination in aqueous slurry in at least three stages with an oxygen present in at least the third stage but absent from the second stage. In the first stage of such process chlorination is conducted at a temperature below about 120° C., preferably between 80–

110° C., until at least 10%, preferably 17%, by weight chlorine is added to the polyethylene. The first stage chlorination may be conducted in the presence of oxygen, which is desirably continuously present until such stage is completed in an amount representing a minor percentage of the total oxygen to be employed. In the second stage the chlorination is continued in the absence of oxygen at a temperature above the crystalline melting point of the polyethylene, usually at least about 135° C., preferably between 135–150° C., until at least about 20%, preferably 25%, by weight chlorine has been added to the polymer. In the third stage chlorination is continued below the crystalline melting point, preferably between 100–120° C., until the desired amount of chlorine is added to the polymer. The remaining, predominant amount of the oxygen is continuously present during the third stage chlorination. Both oxidation and chlorination to the higher chlorine levels above about 60% by weight chlorine cause breakdown or splitting of the long ethylene polymer chains as well as the addition of oxygen and chlorine to the polymer structure. Hence, a reduction in molecular weight to some extent offsetting the increase effected by addition of chlorine is realized by oxidation generally and by chlorination to the higher chlorine levels. Thus, while oxychloropolyethylenes of the desired molecular weight may be therefore produced from ultra high molecular weight polyethylene, the amount of oxygen employed should not be excessive to avoid producing a product of undesirably low molecular weight, particularly when chlorinating to the higher chlorine levels where chlorination itself becomes an important factor in determining molecular weight of the product.

Oxychloropolyethylene giving especially good results may also be produced from intermediate molecular weight polyethylene derived by a thermal degradation process from the ultra high molecular weight polyethylene produced in accordance with British Patent 858,674. By means of such degradation process, also described in said patent, the high molecular weight polyethylene is thermally degraded or depolymerized by heating of the polymer at temperatures of the order of about 350–400° C. in the absence of oxygen. If desired, shearing forces may be applied during the depolymerization. The polyethylene materials produced from the high molecular weight polymers by thermal depolymerization are substantially linear materials having molecular weight within the range of about 30,000 to 300,000, more usually between 40,000 to 200,000, and a density between about 0.935 to 0.985 gm./ml. Such intermediate molecular weight polyethylenes are preferably employed in preparation of the oxychloropolyethylenes containing less than about 70% by weight chlorine. The oxychloropolyethylenes employed in the invention are desirably produced from the polyethylene of intermediate molecular weights by chlorination at temperatures between about 80–120° C., preferably between about 90–110° C., with oxygen present during only a portion of the chlorination period up to its completion, preferably during addition of about the last 3–15% of the total chlorine to be added to the polymer.

The oxychloropolyethylenes of the invention may be employed generally in a variety of metal and other coating applications in which the oxychloropolyethylene is the major or only macromolecular coating material. Materials which are plasticizers or modifying resins for the oxychloropolyethylenes may be added as desired or required to optimized properties for various coating applications. Particular properties which may be desired for an application may be also obtained by selecting an oxychloropolyethylene of particular chlorine content and molecular weight. For example, the oxychloropolyethylenes containing between about 30–60% by weight chlorine, preferably between about 50–60%, are particularly suitable for use in applications where a coating of high flexural strength and impact resistance is desired. Generally, the oxychloropolyethylenes of 30–60% chlorine content have a molecular weight corresponding to an intrinsic viscosity between about 0.2 to 2.0 in o-dichlorobenzene at 100° C. The preferred oxychloropolyethylenes containing 50–60% by weight chlorine preferably have an intrinsic viscosity between about 0.2 to 0.6. The oxychloropolyethylenes containing between about 60–80% by weight chlorine with intrinsic viscosities up to about 0.6, preferably between about 65–78% chlorine, are most suitable for use in situations where hard, protective coatings are desired, particularly on rigid substrates, and where it is desired to optimize the properties of fire and chemical resistance. The particularly preferred high chlorine content oxychloropolyethylenes have a chlorine content greater than about 65% and molecular weight corresponding to an intrinsic viscosity between about 0.08 to 0.3, desirably between about 0.09 to 0.2. These oxychloropolyethylenes are useful in preparing compositions for brush and spray coating applications as evidenced by ability of the polymers to form 20% solids xylene solutions having a viscosity at 25° C. between about 5 to 200 centipoises, desirably between about 10–30 centipoises. The preferred high chlorine content resins having an intrinsic viscosity less than about 0.3 form especially good protective coatings when the coating composition includes a plasticizing material for the oxychloropolyethylene. The amount of plasticizing material employed may vary over a fairly wide range from about 10 to 200 parts per 100 parts by weight of the oxychloropolyethylene. It has been found that particularly excellent protective coatings are produced when the high chlorine content, low intrinsic viscosity polymers are plasticized by addition of a chlorinated aliphatic or aromatic hydrocarbon containing 30–75% by weight chlorine, preferably a liquid plasticizing chlorinated biphenyl having a chlorine content between about 40–70% and a boiling temperature within the range of about 300–450% C. The amount of chlorinated biphenyl preferably employed with the high chlorine content, low molecular weight oxychloropolyethylenes is between about 30–120 parts per 100 parts of the oxychloropolyethylenes. As prepared, the chlorinated phenyls are usually a mixture of isomers having a characteristic distillation range rather than a sharp boiling point. The more preferred chlorinated biphenyls have a total of 5–7 chlorine atoms substituted in the aromatic nuclei of the biphenyl to give a chlorine content of about 50–65% by weight. A specific example of such a preferred chlorinated biphenyl has a chlorine content of about 54% by weight and a distillation range of about 365–390° C. An additional example of a preferred chlorinated biphenyl has a chlorine content of about 62% and a distillation range between about 400–430° C. Other plasticizing materials which may be employed generally in the coating compositions of the invention include the dibasic esters of alcohols having 4 to 16 carbon atoms, preferably derived from phthalic, adipic or sebacic acid, the epoxidized oils and chlorinated aliphatic hydrocarbons. Examples of such materials include, dibutyl phthalate, dioctyl phthalate, diisodecyl phthalate, 2-ethylhexyl phthalate, dioctyl adipate, dioctyl sebacate, epoxidized soya bean oil, the chlorinated aliphatic hydrocarbons containing 40–75% by weight chlorine. The amount of such plasticizers employed with the oxychloropolyethylenes may range between about 10 to 200 parts per 100 parts of resin, preferably between about 30 to 120 parts per 100 parts of resin. Modifying resins which may also be added to the compositions include the indene resins, the coumarone-indene resins, ester gums, the maleic resins, alkyd resins and solid chlorinated aliphatic and aromatic hydrocarbons containing 40–75% by weight chlorine. The modifying resins are usually employed in amounts similar to those employed with the plasticizers. Particularly excellent coating compositions are provided when a normally solid chlorinated polyphenyl containing 40–70% by weight chlorine and melting at a temperature between about 40–120° C. is employed as a modifying resin in combination with the normally liquid plasticizing chlorinated biphenyls. The preferred normally solid chlorinated polyphenyls have a chlorine content between about 50–70% by weight and melting at a temperature within the range of about 60–110° C. The solid chlorinated polyphenyl is generally employed in an amount between 20 to 200 parts per 100 parts of the oxychloropolyethylene with best results obtained when the solid chlorinated polyphenyl is employed in an amount between about 50–120 parts per 100 parts of the oxychloropolyethylene. The addition of the chlorinated phenyls has the advantage of producing coatings of exceptional hardness and high chemical and vapor transmission resistance while permitting rapid and substantially complete release of the solvent during drying of the coating. The oxychloropolyethylenes are also compatible with a number of the common drying oils which may also be added to the coating compositions in an amount between about 10 to 150, preferably 30–100 parts per 100 parts of the oxychloropolyethylene. Examples of such drying oils include refined linseed oil, heat-bodied linseed oil, dehydrated castor oil, soybean oil and china wood oil.

The oxychloropolyethylenes are preferably applied as coating material from a solution in which the oxychloropolyethylene is dissolved in a volatile solvent. In situations where the oxychloropolyethylene is the major or sole macromolecular coating resin the solvent coating compositions usually have dissolved therein between about 5–60%, preferably 10–40%, of the oxychloropolyethylene by weight of the total solvent and oxychloropolyethylene. Suitable high volatile solvents include the low boiling mononuclear aromatic hydrocarbons, cycloaliphatic saturated and unsaturated hydrocarbons, the lower aliphatic ketones and esters having usually 2 to 6 carbon atoms, preferably 3 to 4 carbon atoms, the chlorine-containing lower aliphatic compounds of 1 to 3 carbon atoms and the glycol ethers. Examples of such high volatile solvents include xylene, toluene, benzene, cumene, light petroleum aromatics, cyclohexene, methyl cyclohexene, methyl isobutyl ketone, acetone, methyl ethyl ketone, cyclohexone, tetrahydrofuran, ethyl acetate, butyl acetate, ethylene glycol monobutyl ether, carbon tetrachloride, and trichloroethylene. Mixtures of such solvents may also be employed. The more preferred solvents include xylene, cumene, toluene and the petroleum aromatics. Particularly desirable is a mixture of xylene and cumene.

If desired, pigments and filler may also be added to the coating compositions in amounts ranging up to about 250 parts per 100 parts of oxychloropolyethylene. Examples of suitable pigments are titanium dioxide, red lead, carbon black, phthalocyanine green or blue, etc. Suitable fillers include calcium carbonate, kaolin and clay. While not a necessity for most applications, the coating compositions may also include stabilizers for the chlorinated polyethylenes and scavengers or acceptors for hydrogen chloride present in the polyethylene. Suitable stabilizers are those generally employed with the vinyl polymers, including, for example, the organic complexes and/or metallic salts. The usual small quantities of stabilizer are effective, for instance, 2 to 10 parts per 100 parts of resin. Suitable scavengers include the liquid epoxy resins such as those produced by reaction of epichlorohydrin and Bisphenol-A. Usually between 1 to 5 parts of such scavengers per 100 parts of resin are effective.

The following examples in which parts and percentages are by weight demonstrate the practice and advantages of the present invention. In the examples various coatings are produced and evaluated by a test hereinafter referred to as the "Cross-Hatching Tape Test." According to such test a 1 square inch section of the coating is cut or cross-hatched with a razor blade into 100 squares. A 1 inch wide fresh strip of pressure-sensitive masking tape obtained under the trademark "Scotch" from the Minnesota Mining and Manufacturing Company was applied over all 100 squares and then rapidly removed by peeling away from the substrate. The number of individual squares removed from the substrate surface by the tape determined the adhesive quality of the coating. A value of 100 is assigned when none of the 100 squares was removed from the substrate by the tape. The number of squares removed was subtracted from 100 such that a coating not adhering to the substrate had a rating of 0. In this test a rating of 90 or better indicates a highly satisfactory coating.

Example 1

Polyethylene of about 50,000 weight average molecular weight was prepared by thermal depolymerization of a 1.6 million molecular weight polyethylene prepared by gas phase polymerization of anhydrous oxygen-free ethylene over a catalyst of magnesium dichromate on a porous support with aluminum triisobutyl. The support was composed of silica. The depolymerized polyethylene and high molecular weight polyethylene were prepared in accordance with British Patent 858,674. The depolymerized polyethylene was slurried in about 17 times its weight of water in an enclosed glass lined reactor and chlorinated at a temperature of about 100° C. over the course of about 38 total hours by introduction into the slurry of chlorine at a rate of about 0.106 pound of chlorine per hour per pound of polyethylene charged. After about 60% chlorine had been added to the polyethylene the chlorination was conducted in the presence of oxygen by introducing molecular oxygen into the slurry at a uniform rate in an amount equivalent to about 2.5% total oxygen based on the weight of the polyethylene charged. The resulting slurry was filtered and the product washed and dried at a temperature of about 60° C. for about 24 hours. The product was an oxychloropolyethylene having a chlorine content of 65.5% by weight and an oxygen content of 1.54% based on the total weight of oxygen and carbon in the oxychloropolyethylene. The oxychloropolyethylene product also had a weight average molecular weight corresponding to an intrinsic viscosity of about 0.3 as measured in o-dichlorobenzene at 100° C. There was prepared a composition containing 200 parts xylene, 200 parts methylethylketone and 100 parts of a vinyl chloride-vinyl acetate copolymer resin obtained under the trademark "Geon" 427 from the Goodrich Chemical Company. This composition was brushed on a smooth steel surface and, after drying, the resulting coating was found to have a rating of 0 by the Tape Test. There was then prepared a similar composition containing 211 parts xylene, 200 parts methylethylketone, 100 parts of "Geon" 427 and only about 3.75 parts of the oxychloropolyethylene. A coating of this composition similarly formed on a smooth steel surface was surprisingly found to have a Tape Test rating of 100.

Example 2

There was prepared a composition containing 200 parts xylene, 200 parts methylethylketone, and 100 parts of a vinyl chloride-vinyl acetate copolymer resin obtained under the trademark "Geon" 421 from the Goodrich Chemical Company. This composition was coated on a smooth steel surface and, after air drying for 96 hours, the resulting coating was found to have a rating of 0 by the Tape Test. There was then prepared a similar composition containing 223 parts xylene, 200 parts methylethylketone, 100 parts of "Geon" 421 and only about 7.50 parts of the oxychloropolyethylene produced in Example 1. A coating of this composition similarly formed on a smooth steel surface was surprisingly found to have a Tape Test rating of 100.

Example 3

There was prepared a composition containing 400 parts xylene and 100 parts of "Geon" 222, a vinyl chloride-vinylidene chloride copolymers resin obtained from Goodrich Chemical Company. This composition was coated on a smooth steel surface and, after drying, the resulting coating was found to have a rating of 0 by the Tape Test. There was then prepared a similar composition containing 406 parts xylene, 100 parts of "Geon" 222 and only about 2 parts of the oxychloropolyethylene produced in Example 1. A coating of this composition similarly formed on a smooth steel surface was unexpectedly found to have a Tape Test rating of 100.

*Example 4*

The oxychloropolyethylene prepared in accordance with Example 1 was employed in a coating composition which was a solvent solution prepared by dissolving 100 parts of the oxychloropolyethylene in 400 parts of xylene to form a solvent solution having a solids content of about 20% and a viscosity of 48 centipoises at 25° C. This composition was brushed onto a steel plate as in Example 1 and the resulting coating after air drying was found to have a rating of 100 by the Cross-Hatching Tape Test.

*Example 5*

The oxychloropolyethylene prepared in accordance with Example 1 was employed in a coating composition which was a solvent solution containing 100 parts of the oxychloropolyethylene, 40 parts of a liquid chlorinated biphenyl and 400 parts of xylene. The chlorinated biphenyl was obtained under the trademark "Aroclor" 1254 from the Monsanto Chemical Company and had a chlorine content of about 54% and boiling temperature between about 365–390° C. A coating of this composition formed on the surface of a steel plate as in the preceeding examples was found to have after air drying for 24 hours a Cross-Hatching Tape Test rating of 100.

*Example 6*

For purposes of comparison a chlorinated polyethylene of about 65% by weight chlorine was prepared from the 50,000 molecular weight polyethylene employed in Example 1 and by a process similar to that in Example 1 but without the addition of oxygen. The chlorinated polyethylene product had an intrinsic viscosity of about 0.7 in o-dichlorobenzene at 100° C. A 20% solution of the chlorinated polyethylene in xylene had a viscosity of 3620 centipoises at 25° C. A coating composition prepared from the chlorinated polyethylene of this example and in a manner similar to the composition of Example 5 was coated on a steel surface as in Example 5 and on evaluation by the tape test was found to have a rating of 0 demonstrating complete failure of a conventional chlorinated polyethylene to form a suitable coating on steel surfaces.

*Example 7*

A coating composition similar to that prepared in Example 4 was applied to a sheet of rigid polyvinyl chloride and the resulting coating found by the Tape Test to have a rating of 100. A coating composition prepared from the conventional chlorinated polyethylene of Example 6 was similarly coated on rigid polyvinyl chloride and the resulting coating found by the Tape Test to have a rating of 0.

*Example 8*

A coating composition similar to that prepared in Example 4 was applied to a smooth glass surface and, after drying, the resulting coating was found by the Tape Test to have a rating of 100. A similar coating composition prepared from the conventional chlorinated polyethylene of Example 6 was similarly coated on glass and, after drying, the resulting coating was found to have a rating of 0 by the Tape Test.

*Example 9*

In 475 parts of xylene there was dissolved 100 parts of the conventional chlorinated polyethylene found unsuitable for coating in Example 6 and 25 parts of the oxychloropolyethylene produced in Example 4. This composition was coated on a smooth steel surface and, after drying, the resulting coating was found by the Tape Test to have a rating of 100.

*Example 10*

Low pressure, substantially linear polyethylene of 1,600,000 weight average molecular weight was prepared in accordance with Example of British Patent 858,674 of Jan. 11, 1961 to the Allied Chemical Corporation by gas phase polymerization of anhydrous oxygen-free ethylene over a catalyst of magnesium dichromate on a porous support together with aluminum triisobutyl. The porous support was composed of about 90% silica and 10% alumina. The polyethylene thus produced had a density of about 0.94 and an intrinsic viscosity of about 8 as measured in Decalin at 135° C. In an enclosed reaction vessel the polyethylene was slurried in about 10 times its weight of water and chlorinated under moderate agitation. During the first 1.7 hours chlorination was conducted by introduction of chlorine at a rate equivalent to 0.34 lb. of chlorine per hour per pound of polyethylene to add 17.0% chlorine to the polymer. Along with the chlorination in the first stage oxygen was continuously introduced in a total amount of 0.17% by weight based on the weight of the chlorinated polyethylene. Chlorination in the first stage was conducted at a temperature of 100° C. During the second stage chlorination was conducted in the absence of oxygen at a temperature of 145° C. over the course of about 0.67 hour at a chlorine rate of about 0.36 lb. of chlorine per hour per pound of polyethylene charged until a total of 25% chlorine was added to the polyethylene. Chlorination was then conducted in a third stage in the presence of oxygen at a temperature of 110° C. for about 30 hours at a rate equivalent to 0.2 lb. of chlorine per hour per pound of polyethylene. During third stage chlorination oxygen was continuously introduced in an amount equivalent to 2.23% by weight based on the weight of the polyethylene charged. The resulting slurry was filtered and the product washed and dried at a temperature of about 60° C. for about 24 hours. The oxychloropolyethylene product contained 76.4% chlorine, 1.4% oxygen based on the total weight of oxygen and carbon as determined by ultimate analysis, and had a weight average molecular weight corresponding to an intrinsic viscosity of 0.1 as measured in o-dichlorobenzene at 100° C. A 20% solution of the oxychloropolyethylene in xylene had a viscosity of 20 centipoises at 25° C. with less than 1% gel solids removed from the solution by a cartridge type filter. A coating composition was prepared by dissolving 100 parts of the oxychloropolyethylene and 40 parts of "Aroclor" 1254 in 100 parts xylene. About 2 parts of an epoxy compound was added as HCl acceptor. The epoxy compound, reaction product of epichlorohydrin and Bisphenol-A, was obtained under the trademark "Epon" 828 from the Shell Chemical Company. The resulting composition had a solids contents of about 20% and was brushed over an area of about 24 square inches on a smooth surface of a steel plate. The coating was allowed to air dry over a course of about 72 hours. The resulting coating was evaluated by Cross-Hatching Tape Test and found to have a rating of 100.

*Example 11*

The oxychloropolyethylene prepared in Example 10 was employed in a coating composition containing 19.4 parts of the oxychloropolyethylene, 19.4 parts of the "Aroclor" 1254 plasticizer, 32.4 parts titanium dioxide, 12.4 parts xylene, and 24.7 parts High-Flash Solvent. High Flash Solvent was obtained from the Allied Chemical Corporation and comprised a mixture of cumenes. About 2 parts of "Epon" 828 was also added. A coating of this composition formed on solvent cleaned galvanized metal surface was found to have after air drying for 72 hours a Cross-Hatching Tape Test rating of 100. The coated galvanized metal was also subjected to accelerated weather and endurance testing in a Weather-O-meter (Atlas Electric Devices Company) by subjecting for 1,000 hours to repeated cycles of 51 minutes of light only to a maximum of 140° F. panel temperature followed by 9 minutes of light and water spray with water at 40° F. After such endurance test the coating was found to be intact and exhibited flexibility over 1/8" mandrel without flaking or disbondment.

*Example 12*

For purposes of comparison a chlorinated polyethylene of 75% by weight chlorine was prepared from the polyethylene employed in Example 10 and by the process similar to that in Example 10 but without the addition of oxygen. The chlorinated polyethylene product had an intrinsic viscosity of about 0.7 in o-dichlorobenzene at 100° C. A 10% solution of the chlorinated polyethylene in xylene had a viscosity of 67 centipoises at 25° C. The composition was coated upon a steel surface as in Example 10 and on evaluation by the Cross-Hatching Tape Test was found to have a rating of only 31.

*Example 13*

The oxychloropolyethylene prepared in Example 10 was employed in a coating composition prepared similar to that of Example 10 except that the composition was composed of about 14.3 parts of the oxychloropolyethylene, 14.3 parts of "Aroclor" 1254, 14.3 parts of solid chlorinated polyphenyl, 25.2 parts of titanium dioxide, 10 parts of xylene, and 20 parts of High-Flash Solvent. About 2 parts of "Epon" 828 was also added. The chlorinated polyphenyl was obtained under the trademark "Aroclor" 5460 from the Monsanto Chemical Company and was composed of chlorinated polyphenyls having a chlorine content of 60% and melting temperature between about 100–105.5° C. This coating composition was brushed onto the smooth surface of a steel plate and after air drying for 96 hours was found to have a rating of 100 by the Cross-Hatching Tape Test. After air drying for one month the coating was found to have a Sward Hardness of 14.7 and also flexibility such that the coating passed the 1/8 inch mandrel. The coating was also unaffected by 50% caustic and sulfuric acid solutions and by 5% sodium hypochlorite. The coating also had a gloss of 95 at an angle of 85° C.

It is well known practice in the art of characterizing macromolecular resins to calculate a molecular weight figure from the figure determined for intrinsic viscosity of the resin. The molecular weight figures thus calculated depend, of course, upon the particular formula used for the calculation and accordingly should be regarded as approximate rather than exact. They represent approximate weight average molecular weights.

Intrinsic viscosity, as the term is used herein, is defined as the limit, at infinite dilution, of specific viscosity ($N_{sp}$) divided by concentration (C) expressed in grams of resin per deciliter of solution. Specific viscosity is measured as: $(t-t_o)/t_o$, where $t$ is the effluent time for a given quantity of polymer solution from a standard pipet and $t_o$ is the effluent time for an equal quantity of the pure solvent. Intrinsic viscosity can be determined, accordingly, by plotting $(N_{sp})/C$ against C, at low concentrations, and extrapolating the resulting curve to 0 concentration.

The intrinsic viscosities reported herein are determined in accordance with ASTM Test D1601–61, the units thereof being deciliters per gram. Intrinsic viscosities of the oxychloro polymers of this invention herein reported in ortho-dichlorobenzene solvent at 100° C., and for ethylene polymers herein the intrinsic viscosities are in Decalin solvent at 135° C.

The densities of polymers reported herein are determined by ATSM Test D792–60T at 23° C. and are in units of grams per milliliter.

Although certain preferred embodiments of the invention have been disclosed for purpose of illustration, it will be evident that various changes and modifications may be made therein without departing from the scope and spirit of the invention.

I claim:
1. A coating composition comprising a volatile solvent solution containing: (A) a chlorine-containing macromolecular resin having carbon to carbon alkylene linkage and a chlorine content between about 30–80% by weight; and (B) at least about 1 part per 100 parts of said chlorine-containing macromolecular resin of an oxychloropolyethylene of linear polyethylene containing chemically combined chlorine in an amount of 30–80% by weight and chemically combined oxygen in an amount of 0.3–3% by total weight of oxygen and carbon in the oxychloropolyethylene, said oxychloropolyethylene having an intrinsic viscosity between about 0.08 to 2.0 deciliter/gram in o-dichlorobenzene at 100° C.

2. A coating composition comprising a volatile solvent solution containing: (A) a chlorine-containing macromolecular resin having carbon to carbon alkylene linkage and a chlorine content between about 30–80% by weight; and (B) at least about 1 part per 100 parts of said chlorine-containing macromolecular resin of an oxychloropolyethylene of linear polyethylene containing chemically combined chlorine in an amount of 40–70% by weight and chemically combined oxygen in an amount of 0.3–3% by total weight of oxygen and carbon in the oxychloropolyethylene, said oxychloropolyethylene having an intrinsic viscosity between about 0.1 to 0.8 deciliter/gram in o-dichlorobenzene at 100° C.

3. A coating compisition comprising a volatile solvent solution containing: (A) polyvinyl chloride and (B) about 1 to 50 parts per 100 parts of polyvinyl chloride of an oxychloropolyethylene of linear polyethylene containing chemically combined chlorine in an amount of 40–70% by weight and chemically combined oxygen in the amount of 0.3–3% by total weight of oxygen and carbon in the oxychloropolyethylene, said oxychloropolyethylene having an intrinsic viscosity between about 0.1 to 0.8 deciliter/gram in o-dichlorobenzene at 100° C.

4. A coating composition comprising a volatile solvent solution containing: (A) a vinyl chloride copolymer of 80 to 95 parts vinyl chloride and 5 to 20 vinyl acetate; and (B) about 1 to 50 parts per 100 parts of said copolymer of an oxychloropolyethylene of linear polyethylene containing chemically combined chlorine in an amount of 40–70% by weight and chemically combined oxygen in the amount of 0.3–3% by total weight of oxygen and carbon in the oxychloropolyethylene, said oxychloropolyethylene having an intrinsic viscosity between about 0.1 to 0.8 deciliter/gram in o-dichlorobenzene at 100° C.

5. A coating composition comprising a volatile solvent solution containing: (A) a vinyl chloride copolymer of 50 to 95 parts vinyl chloride and 5 to 50 parts vinylidene chloride; and (B) about 1 to 50 parts per 100 parts of said copolymer of an oxychloropolyethylene of linear polyethylene containing chemically combined chlorine in an amount of 40–70% by weight and chemically combined oxygen in the amount of 0.3–3% by total weight of oxygen and carbon in the oxychloropolyethylene, said oxychloropolyethylene having an intrinsic viscosity between about 0.1 to 0.8 deciliter/gram in o-dichlorobenzene at 100° C.

6. A coating composition comprising a volatile solvent solution containing: (A) a chlorinated polyethylene having a chlorine content between about 30 to 80% by weight; and (B) about 1 to 50 parts per 100 parts of said chlorinated polyethylene of an oxychloropolyethylene of linear polyethylene containing chemically combined chlorine in an amount of 40–70% by weight and chemically combined oxygen in the amount of 0.3–3% by total weight of oxygen and carbon in the oxychloropolyethylene, said oxychloropolyethylene having an intrinsic viscosity between about 0.1 to 0.8 deciliter/gram in o-dichlorobenzene at 100° C.

7. A composition especially suitable for coating of surfaces comprising a volatile solvent solution containing: (A) between about 10–40% by weight of an oxychloropolyethylene of linear polyethylene containing chemically combined chlorine in an amount of 65–80% by weight and chemically combined oxygen in an amount of 1–2% by total weight of oxygen and carbon in the oxychloropolyethylene, said oxychloropolyethylene having an intrinsic viscosity between about 0.08 to 0.3 deciliter/gram in o-dichlorobenzene at 100° C.; (B) about 10 to 200 parts by weight per 100 parts of said oxychloropolyethylene of a chlorinated biphenyl having a chlorine content between about 40–70% by weight; and (C) about 10 to 200 parts by weight per 100 parts of said oxychloropolyethylene of a normally solid chlorinated polyphenyl having a chlorine between about 40–70% by weight and melting temperature between about 40–120° C.

References Cited
UNITED STATES PATENTS

| | | | |
|---|---|---|---|
| 2,964,517 | 12/1960 | Eck et al. | 260—94.9 |
| 3,049,455 | 8/1962 | Werkman et al. | 260—94.9 |
| 3,202,628 | 8/1965 | Burd | 260—897 |

MORRIS LIEBMAN, *Primary Examiner.*

R. BARON, *Assistant Examiner.*